June 19, 1945.  E. E. SENSEL  2,378,733
CATALYTIC CONVERSION OF HYDROCARBONS
Filed Feb. 23, 1942
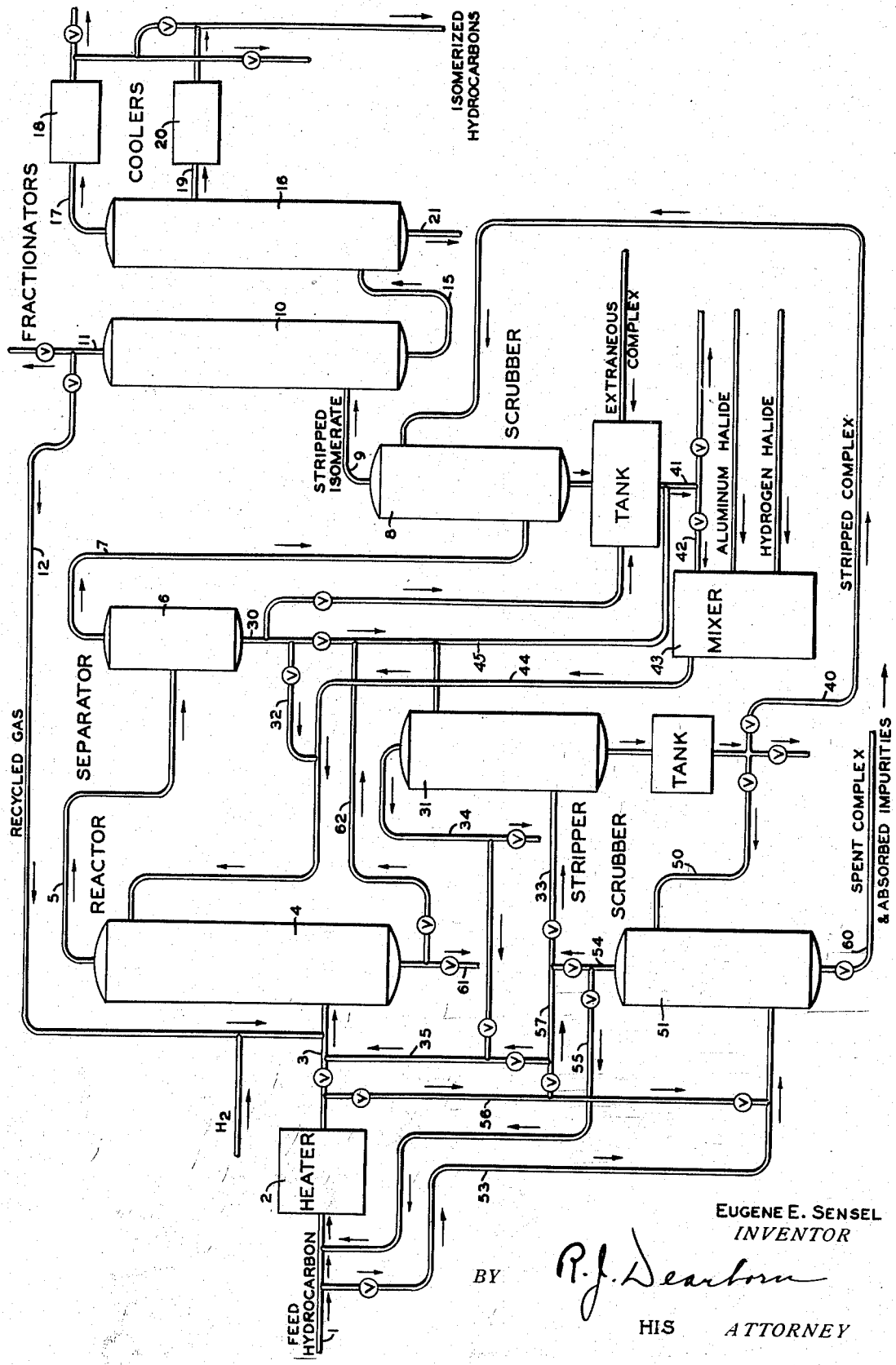
EUGENE E. SENSEL
INVENTOR
BY R. J. Dearborn
HIS ATTORNEY Patented June 19, 1945

2,378,733

UNITED STATES PATENT OFFICE 2,378,733

CATALYTIC CONVERSION OF HYDROCARBONS

Eugene E. Sensel, Beacon, N. Y., assignor to The Texas Company, New York, N. Y., a corporation of Delaware Application February 23, 1942, Serial No. 431,997

15 Claims. (Cl. 260—683.5)

This invention relates to the catalytic conversion of hydrocarbons, particularly for the manufacture of gasoline hydrocarbons of improved antiknock value.

The invention contemplates a process for converting hydrocarbons by the action of a metallic halide-hydrogen halide type of catalyst with provision for recovering catalyst dissolved or contained in the converted hydrocarbons withdrawn from the conversion reaction and returning the so-recovered catalyst to the conversion reaction.

The invention contemplates employing a suitable scrubbing medium to remove contained catalyst, or promoter, or both catalyst and promoter contained in the converted hydrocarbons and then employing a stream of feed hydrocarbon passing to the conversion reaction to strip the removed catalyst and promoter from the enriched scrubbing medium.

One modification of the invention has particular application to conversion processes wherein hydrocarbons are subjected to the action of a metallic halide such as aluminum halide in the presence of hydrogen halide and wherein substantial amounts of metallic halide-hydrocarbon complex may be accumulated as an incident to the conversion or may be employed as a component of the catalyst mixture used in the conversion reaction. With such type of process the invention contemplates employing metallic halide-hydrocarbon complex liquid as the scrubbing medium. Advantageously a body of complex liquid substantially denuded of free metallic halide and hydrogen halide is used to scrub the hydrocarbon reaction products withdrawn from the reaction zone, so as to absorb metallic halide and hydrogen halide dissolved in the effluent hydrocarbons. The complex liquid enriched with metallic halide and hydrogen halide may then be returned to the reaction zone or may have the absorbed material stripped therefrom by a stream of the feed hydrocarbon passing to the reaction zone.

In the conversion of hydrocarbons with a metallic halide catalyst, as for example, in the isomerization of gasoline hydrocarbons with aluminum chloride in the presence of hydrogen chloride the effluent hydrocarbons from the conversion reaction contain substantial amounts of aluminum chloride and hydrogen chloride dissolved therein due to the solubility of these materials in the hydrocarbons, particularly at the temperatures prevailing in the reaction zone. Therefore, it is desirable to recover this dissolved material and return it to the system. One advantage of doing so is to avoid corrosion difficulties in the fractionating apparatus, and also to avoid plugging of pipes through accumulation of precipitated catalyst.

Aluminum halide and hydrocarbons interact to form liquid complex compounds and it has been found that aluminum halide such as aluminum chloride, and hydrogen halide such as hydrogen chloride are soluble in this liquid complex to a sufficient extent so that this complex liquid provides an effective agent for removing these materials from solution in hydrocarbons such as the effluent hydrocarbons from the conversion reaction zone. Depending upon the type of conversion process used this complex liquid containing aluminum halide and hydrogen halide removed from the effluent hydrocarbons may be returned directly to the conversion reaction zone or may be subjected to contact with a stream of feed hydrocarbon passing to the reaction zone whereby the absorbed free aluminum halide and hydrogen chloride are stripped from the liquid complex.

The invention is of advantage in conversion processes employing as the catalyst a liquid mixture composed of metallic halide contained or suspended in metallic halide-hydrocarbon complex liquid. In this type of process a portion of the complex liquid component of the catalyst is used as the scrubbing agent. The portion so used as a scrubbing agent is advantageously first subjected to contact with a stream of feed hydrocarbon in a separate treating zone wherein metallic halide and hydrogen halide with which the complex liquid may be saturated is stripped therefrom thereby leaving a substantially denuded complex liquid. This substantially denuded complex liquid is then used to scrub the converted hydrocarbons withdrawn from the conversion zone, and the complex liquid after enrichment with metallic halide and hydrogen halide removed from the effluent hydrocarbons can be returned to the reaction zone. Prior to return it may have added to it small amounts of metallic halide and hydrogen halide as makeup.

Reference will now be made to the accompanying drawing comprising a flow diagram illustrating one mode of practicing the invention as applied to the isomerization of gasoline hydrocarbons.

A stream of feed hydrocarbon such as a gasoline fraction boiling in the range about 90 to 160° F. is conducted from a source not shown through a pipe 1 leading to a heater 2:

From the heater 2 the heated hydrocarbon feed passes through a pipe 3 leading to a reactor 4, which may be of any suitable type for effecting the necessary contact between the hydrocarbon undergoing treatment and the catalyst.

The catalyst may comprise a mixture of aluminum chloride and aluminum chloride-hydrocarbon complex. Thus, in starting up, the reaction vessel may be substantially completely filled or partially filled with a preformed complex liquid prepared by reacting aluminum chloride with feed hydrocarbon or other suitable hydrocarbon or derivatives thereof in the presence of a small amount of hydrogen chloride to form complex liquid. The complex may also be that accumulated from previous operations. Free anhydrous aluminum chloride is mixed with the complex liquid, for example in the proportion of about 5 to 200 parts by weight of aluminum chloride to 100 parts of complex liquid.

A temperature in the range 150 to about 300°, usually in the range 200 to 300° F., is maintained in the reactor 4. The reaction temperature may be maintained by the self-contained heat of the entering feed hydrocarbon or it may be maintained by heating coils or jackets provided as an integral part of the reactor.

A small amount of activator capable of providing hydrogen halide present in the reactor may be added directly to the reactor as, for example, in the entering feed or may be added to the recycled complex liquid to which reference will be made later.

Where a reactor employing agitation of the reaction mixture is employed a stream of reaction mixture is continuously withdrawn from the reactor through a pipe 5 and conducted to a separator 6 wherein the withdrawn mixture separates into hydrocarbon and catalyst phases respectively.

The hydrocarbon phase accumulating in the upper portion of the separator is continuously withdrawn therefrom through a pipe 7 and conducted to a scrubber 8 wherein it is subjected to scrubbing contact with complex liquid to which reference will be made shortly. The scrubbed hydrocarbon phase leaves the top of the scrubber through a pipe 9 and is passed to the lower portion of a fractionating or distilling column 10. Prior to passage to the column 10 the scrubbed hydrocarbons may be cooled to precipitate remaining dissolved aluminum chloride or otherwise treated as, for example, with chemical treating agents. The column 10 is advantageously operated to remove gaseous constituents that may remain in the converted hydrocarbons. These gaseous constituents are removed through a pipe 11 and may be discharged from the system or at least a portion thereof may be recycled through a pipe 12 to the reactor 4. Recycling of the gas is of advantage when it contains substantial amounts of hydrogen chloride or other promoting material. Likewise if the reaction is carried out in the presence of hydrogen the gases discharged through the pipe 11 may comprise a large amount of hydrogen which is advantageously recycled through the pipe 12.

The de-gasified hydrocarbons are removed from the bottom of the column 10 through a pipe 15 and conducted to the lower portion of a second column 16. Prior to introduction to the column 16 these hydrocarbons may be treated to remove any remaining halide, particularly in the event that such step is omitted prior to introduction to the column 10. Operation of the column 16 may be regulated in any suitable manner so as to separate any desired fraction or fractions from the converted hydrocarbons.

For example, the fractionation may involve debutanization of the isomerized naphtha to remove a butane fraction which is drawn off from the top of the fractionator through a pipe 17 and cooler 18. A side stream comprising isomerized naphtha of desired boiling range may be drawn off through a pipe 19 and cooler 20 while heavy hydrocarbon material may be drawn off from the bottom of the fractionator through a pipe 21.

Referring again to the separator 6 the catalyst phase accumulating in the bottom thereof is continuously drawn off through a pipe 30 communicating with a stripper 31. This catalyst phase comprises aluminum halide and aluminum halide-hydrocarbon complex liquid and also contains some dissolved hydrogen chloride.

A portion of the withdrawn catalyst phase may be recycled directly through a branch pipe 32 to the reactor 4. Sufficient of this catalyst phase may be continuously recirculated in this way through the reactor 4 and separator 6 so as to impart the desired degree of agitation in the reactor 4. However, it is contemplated that other means of effecting agitation may be preferred.

That portion of the withdrawn catalyst phase passing to the stripper 31 is subjected therein to contact with a stream of feed hydrocarbon entering the stripper 31 through a pipe 33. The stripper may be in the form of a packed tower arranged for countercurrent flow of complex and feed hydrocarbon as indicated in the drawing. On the other hand this stripping may be effected in any other suitable type of apparatus wherein free aluminum halide and hydrogen halide contained in the complex is stripped therefrom.

This stripping action may be effected at a temperature ranging from about 100 to 300° F. or in the range 200 to 300° F. or even higher. The stripping temperature may be sufficiently low so that no substantial conversion of feed hydrocarbon occurs during contact with the complex liquid and its contained aluminum halide and hydrogen halide. However, some conversion may take place in which case the reaction products, along with the remainder of the stream of feed hydrocarbons passing through the stripper 31, will be removed from the top thereof through a pipe 34 communicating with a pipe 35 leading to the pipe 3 previously mentioned and through which the feed hydrocarbon is introduced to the reactor 4.

In any event conditions are maintained within the stripper 31 so as to displace or dissolve at least to a substantial extent the free aluminum halide and hydrogen halide contained in the complex liquid passing to the stripper 31 and thereby produce a stripped or substantially denuded complex liquid.

In order to effect this stripping action it is desirable to maintain a relatively large volume of stripping medium to volume of complex being treated, for example, several volumes or more of feed hydrocarbon per volume of complex.

This stripped complex is drawn off into a receiving tank and at least a portion thereof may be passed through a pipe 40 directly to the previously mentioned scrubber 8 wherein it is brought into intimate contact with a stream of converted hydrocarbons being drawn off from the separator 6 as previously mentioned. This scrubber apparatus may be generally similar to that for the stripper 31. Temperature conditions within the scrubber 8 may be adjusted so as to maintain a temperature in the range 70 to about 300° F. and such that the stripped complex will absorb aluminum halide and hydrogen halide contained in the withdrawn converted hydrocarbons.

The enriched complex liquid is drawn off from the bottom of the scrubber into a receiving tank and from there through a pipe 41 communicating with a branch pipe 42 leading to a mixer or surge tank 43. From the mixer or tank 43 the enriched complex liquid is passed through a pipe 44 communicating with the reactor 4 and by which means the enriched complex liquid is returned to the reaction zone.

Advantageously make-up aluminum halide and hydrogen halide are incorporated in the enriched complex liquid in the mixer 43 as indicated in the drawing. Otherwise make-up may be added directly to the reactor 4.

Instead of passing the enriched complex from the scrubber 8 to the mixer 43 all or a portion of the enriched complex liquid may be passed through branch pipe 45 communicating with the previously mentioned stripper 31 wherein it is subjected to the stripping action of a stream of feed hydrocarbon passing to the reactor 4.

That portion of the stripped complex liquid drawn off from the bottom of the stripper 31 and not passed through the pipe 40 is drawn off through a branch pipe 50 leading to another contacting apparatus such as a scrubber 51 wherein it may be used for scrubbing all or a portion of the initial hydrocarbon feed for the purpose of removing impurities therefrom such as olefinic, aromatic and sulfur compounds which if not removed would cause poisoning or deterioration of the catalyst in the reactor 4.

Thus, when it is desired to extract impurities from the feed hydrocarbon the latter may be by-passed from the pipe 1 through a pipe 53 leading to the lower portion of the scrubber 51. The feed thus flows upwardly through the scrubber countercurrently to the stripped complex liquid and escapes from the scrubber 51 through a pipe 54 communicating with either the previously mentioned pipe 33 or the previously mentioned feed pipe 1 at a point corresponding to the inlet of the heater 2. Thus, the necessary portion of the scrubbed feed may be diverted through the pipe 33 leading to the stripper 31 to provide for the desired stripping of the complex liquid therein. The portion of the scrubbed feed leaving the scrubber 51 which is not passed to the stripper 31 can be passed through a branch pipe 55 for passage to the heater 2.

The temperature prevailing in the scrubber 51 may be adjusted by controlling the temperature of the entering feed hydrocarbon and this may be accomplished by passing a portion of the feed through the heater 2 and diverting this heated portion through a pipe 56 communicating with the lower portion of the scrubber 51.

Some of the heated portion of feed hydrocarbon may likewise be diverted through a branch pipe 57 communicating with the previously mentioned pipe 33 so as to adjust the temperature within the stripper 31.

The complex liquid used as a scrubbing medium in the scrubber 51 is drawn off through a pipe 60 through which it may be discharged from the system.

Provision may be made for drawing off heavy complex and heavy hydrocarbon material from the bottom of the reactor 4 either continuously or intermittently through a pipe 61. All or a portion thereof may be passed through a pipe 62 to the stripper 31.

As already indicated the temperatures prevailing in the stripper 31 and the scrubber 8 may be varied depending upon the degree of stripping or scrubbing required which in turn will also be influenced by the nature of the hydrocarbon undergoing treatment and the specific halide being used in the system. The solubility of aluminum chloride, for example, in a light naphtha boiling in the range 100 to 150° F. ranges from about $\frac{1}{10}$ of a per cent by weight of aluminum chloride in the hydrocarbon at about room temperature to about $\frac{1}{5}$ of a per cent at about 200° F. and somewhat more than 1% at about 300° F. The solubility appears to be somewhat greater in the case of lighter hydrocarbons, for example, in the case of normal butane the solubility of aluminum chloride ranges from about $\frac{2}{10}$ or $\frac{1}{10}$ of a per cent by weight of aluminum chloride in the hydrocarbon at 100° F. to 2% or more at a temperature of about 200° F.

For this reason in an operation for the isomerization of naphtha or fractions thereof it may be advantageous to employ a relatively light portion of the feed as the stripping agent in the stripper 31. For example, a portion of the butane fraction previously referred to as being removed through the cooler 18 may be used as the stripping agent in the stripper 31.

The butane containing aluminum halide and hydrogen chloride stripped from the complex liquid in the stripper 31 may then be passed to the reactor 4. It is frequently advantageous when isomerizing naphtha or fractions thereof to effect the reaction in the presence of a large amount of butane, for example, isobutane, or a mixture comprising iso- and normal butane in which the isobutane is in excess. It has been found advantageous when isomerizing naphtha hydrocarbons to maintain isobutane present in the reaction in an amount by weight substantially greater than that of the feed naphtha undergoing conversion for the purpose of inhibiting cracking and catalyst deterioration. For example, the isobutane may range from about 2 to 4 parts of isobutane to 1 part of feed naphtha.

If desired the reaction may be effected in the presence of substantial amounts of hydrogen, or in the presence of both hydrogen and isobutane or butanes.

While the employment of a feed comprising naphtha or fractions thereof has been referred to above nevertheless it is contemplated that the feed may comprise any gasoline or naphtha hydrocarbon either normally gaseous or normally liquid and which it may be desired to convert into a hydrocarbon of more highly branched chain character. For example, the feed may comprise normal butane or normal pentane.

Also while the employment of a fluid catalyst has been described it is also contemplated that the catalyst employed in the reactor 4 may be in solid fragmentary form such as lumps, particles or powder. In such case the complex liquid used as a scrubbing agent in the scrubber 6 may be obtained from some other source such as an alkylation process using a metallic halide catalyst, and would not be returned to the reactor 4. Instead, it would merely be recirculated through the scrubber 8 and stripper 31 including the scrubber 51 if desired.

The invention is applicable to conversion reactions wherein the catalyst is employed in either liquid or solid form or as a mixture of liquid and solid. It is also applicable to operations in which the hydrocarbon undergoing conversion is in either liquid or vapor phase.

Accordingly, the reactor 4 may be of any suitable design other than that previously referred to above. Thus, where a solid catalyst is used it may comprise a single packed tower containing the catalyst or a plurality of such towers.

When a fluid catalyst is being used a tower packed with inert packing material may be employed with provision for circulating the fluid catalyst over the packing material countercurrently to the feed hydrocarbon passing therethrough. It is also contemplated that an unpacked tower or vessel substantially filled with a relatively stationary body of fluid catalyst or liquid in which solid catalyst is suspended may be employed. With this latter type of tower the feed hydrocarbon is introduced to the lower portion thereof and flows upwardly through the body of heavier catalyst mixture by difference in density.

Various metallic halide catalysts may be employed such as aluminum chloride, aluminum bromide, ferric chloride, zirconium chloride, beryllium chloride, titanium tetrachloride, stannic tetrachloride, boron trifluoride, antimony chloride, metallic mixed halides such as $AlCl_2F$, $AlF_2Cl$, etc. or mixtures of halides such as $AlCl_3-SbCl_3$, $AlCl_3-NaCl$, etc.

Suitable promoters other than hydrogen chloride may be hydrogen bromide, hydrogen iodide, hydrogen fluoride, carbon tetrachloride, alkyl, aryl or acyl halides or any substance which is capable of liberating halogen halide after coming into contact with the metallic halide catalyst. Chlorine, bromine, iodine and fluorine may be injected for purposes of promoting the reaction.

The invention is applicable to any system in which aluminum chloride or a similar somewhat soluble metallic halide is used, for example, the alkylation of paraffins or aromatics, Friedel-Craft reactions and so forth.

Obviously many modifications and variations of the invention, as hereinbefore set forth, may be made without departing from the spirit and scope thereof, and therefore only such limitations should be imposed as are indicated in the appended claims.

I claim:

1. A continuous process for isomerizing hydrocarbons comprising passing a feed hydrocarbon stream to a conversion zone containing a fluid catalyst mixture of aluminum halide and aluminum halide-hydrocarbon complex, subjecting the feed hydrocarbon and catalyst to contact therein in the presence of hydrogen halide under conditions such that substantial isomerization of feed hydrocarbons is secured, withdrawing from the conversion zone a stream of liquid comprising converted hydrocarbons and having some aluminum halide dissolved therein, withdrawing from the conversion zone another stream comprising aluminum halide-hydrocarbon complex liquid, subjecting withdrawn complex liquid to contact with a stream of feed hydrocarbon passing in liquid phase to the conversion zone whereby free aluminum halide and hydrogen halide retained in the withdrawn complex are extracted therefrom by solution in said stream of feed hydrocarbon for return to the conversion zone leaving a stripped complex, subjecting the withdrawn converted hydrocarbons to contact in liquid phase with stripped complex whereby aluminum halide and hydrogen halide contained in the withdrawn liquid hydrocarbons are extracted therefrom, and returning complex containing catalyst extracted from the converted hydrocarbons to the conversion zone.

2. In a continuous process for isomerizing hydrocarbons wherein a stream of feed hydrocarbon is passed to a conversion zone containing a fluid catalyst comprising a mixture of aluminum halide and aluminum halide-hydrocarbon complex, the feed hydrocarbon and catalyst mixture being subjected to contact therein in the presence of hydrogen halide under conditions such that substantial isomerization of feed hydrocarbons is secured, the steps comprising removing from the conversion zone used complex, subjecting said removed complex to contact in a stripping zone with a stream of feed hydrocarbon passing in liquid phase to the conversion zone whereby free aluminum halide and hydrogen halide contained in the complex are extracted therefrom by solution in said stream of feed hydrocarbon for return to the conversion zone leaving a stripped complex, removing stripped complex, withdrawing a stream of converted hydrocarbons in liquid phase from the conversion zone, said stream containing some aluminum halide and hydrogen halide dissolved therein, subjecting said withdrawn stream to contact in liquid phase with a portion of said stripped complex whereby aluminum halide and hydrogen halide are extracted from the converted hydrocarbons, returning complex containing catalyst extracted from the converted hydrocarbons to the conversion zone and employing remaining stripped complex to scrub feed hydrocarbon passing to said stripping zone to remove impurities therefrom.

3. The method according to claim 2 in which the aluminum halide comprises aluminum chloride.

4. In a process for isomerizing naphtha hydrocarbons wherein a stream of naphtha is passed to a conversion zone containing a catalyst comprising a mixture of aluminum halide and aluminum halide-hydrocarbon complex maintained under isomerizing conditions and the isomerized naphtha hydrocarbons are removed from the conversion zone and subsequently fractionated to separate a fraction rich in butane and another fraction comprising normally liquid hydrocarbons, the steps comprising withdrawing from the conversion zone a stream comprising used complex, subjecting withdrawn complex to contact with a stream of said butane fraction in liquid phase whereby free aluminum halide contained in the complex is extracted therefrom by solution in said stream of butane, passing butane containing aluminum halide extracted from the complex to the conversion zone leaving a stripped complex, withdrawing from the conversion zone a stream of liquid comprising converted hydrocarbons having some aluminum halide dissolved therein, subjecting the withdrawn hydrocarbon stream to contact in liquid phase with stripped complex whereby aluminum halide is extracted from said converted hydrocarbons, passing complex containing aluminum halide scrubbed from the converted hydrocarbons to the conversion zone, and passing the scrubbed hydrocarbon product to the fractionating zone.

5. In a process for effecting catalytic conversion of hydrocarbons by the action of a metallic halide conversion catalyst in the presence of hydrogen halide wherein a stream of feed hydrocarbon is passed through a reaction zone containing the catalyst at a reaction temperature at which at least a small amount of hydrogen halide is soluble in the hydrocarbons undergoing treatment and converted hydrocarbons containing some hydrogen halide are withdrawn from said reaction zone, the steps comprising passing withdrawn converted hydrocarbons to a scrubbing zone, subjecting said withdrawn hydrocarbons while in liquid phase to contact therein with a liquid body of metallic halide-hydrocarbon complex which is incompletely saturated with hydrogen halide, effecting the contact under conditions such that hydrogen halide is absorbed by the complex from the converted hydrocarbons, removing the scrubbed hydrocarbons, passing the complex scrubbing liquid and absorbed hydrogen halide to a stripping zone and subjecting it to contact therein with feed hydrocarbon, passing to the conversion zone, whereby absorbed hydrogen halide is extracted from the scrubbing liquid by solution in the feed hydrocarbon for return to the conversion zone.

6. The method according to claim 5 in which the scrubbing is effected at a temperature in the range about 70 to 300° F. while the stripping is effected at a temperature in the range about 100 to 300° F.

7. In a process for effecting catalytic conversion of hydrocarbons by the action of a catalyst comprising metallic halide mixed with metallic halide-hydrocarbon complex liquid in the presence of hydrogen halide wherein a stream of feed hydrocarbon is passed through a reaction zone containing the catalyst at a reaction temperature at which at least a small amount of hydrogen halide is soluble in hydrocarbons undergoing treatment, the steps comprising withdrawing from the conversion zone a stream of liquid hydrocarbon phase containing some hydrogen halide, separately withdrawing a stream of liquid catalyst phase, subjecting withdrawn liquid catalyst phase to contact with feed hydrocarbon passing to the conversion zone whereby hydrogen halide contained in the withdrawn catalyst phase is stripped therefrom for return to the conversion zone, subjecting withdrawn hydrocarbon while in liquid phase to contact with the stripped catalyst phase whereby hydrogen halide contained in the hydrocarbon phase is scrubbed therefrom and returning the catalyst phase containing hydrogen halide scrubbed from the hydrocarbon phase to the reaction zone.

8. The method according to claim 7 in which the stripping is effected at a temperature in the range 100 to 300° F. while the scrubbing is effected at a temperature in the range about 70 to 300° F.

9. In a continuous process for effecting catalytic conversion of hydrocarbons by the action of a metallic halide conversion catalyst, the metallic halide being at least partially soluble in the hydrocarbons undergoing treatment, the steps comprising passing a stream of feed hydrocarbons through a primary reaction zone, subjecting the hydrocarbons in said primary zone to contact with a catalyst body comprising a mixture of metallic halide-hydrocarbon complex liquid and free metallic halide, effecting said contact at a conversion temperature and in the presence of hydrogen halide promoter such that substantial conversion occurs and some metallic halide is dissolved in the hydrocarbons undergoing conversion, passing said stream in liquid phase containing converted hydrocarbons and metallic halide dissolved therein from the primary zone to a secondary zone, subjecting said stream in the secondary zone to contact with metallic halide-hydrocarbon complex liquid which is sufficiently unsaturated with free metallic halide to absorb free metallic halide in substantial amount, effecting the secondary contact at a temperature in the range about 70 to 300° F. such that said unsaturated complex extracts from said liquid hydrocarbon stream metallic halide previously dissolved therein during passage through the primary zone, and discharging from said secondary zone said hydrocarbon stream substantially reduced in dissolved metallic halide content.

10. In a continuous process for isomerizing saturated hydrocarbons by contact with an aluminum halide catalyst in the presence of hydrogen halide, the steps comprising passing a stream of feed hydrocarbons through a primary reaction zone, subjecting the feed hydrocarbons therein to contact with an isomerization catalyst comprising a mixture of aluminum halide-hydrocarbon complex liquid and free aluminum halide, effecting said contact in the presence of hydrogen halide under conditions such that isomerization constitutes the principal reaction and some aluminum halide is dissolved in the hydrocarbons undergoing isomerization, passing said stream in liquid phase containing isomerized hydrocarbons and aluminum halide dissolved therein from the primary zone to a secondary zone, subjecting said stream in the secondary zone to contact with aluminum halide hydrocarbon complex liquid which is sufficiently unsaturated with free aluminum halide to absorb free aluminum halide in substantial amount, effecting said secondary contact at a temperature in the range corresponding approximately to that prevailing in the primary zone such that said unsaturated complex extracts from said liquid stream aluminum halide previously dissolved therein during passage through the primary zone, and discharging from said secondary zone said hydrocarbon stream substantially reduced in dissolved aluminum halide content.

11. In a continuous process for isomerizing saturated hydrocarbons by contact with an aluminum halide catalyst in the presence of hydrogen halide, the steps comprising passing a stream of feed hydrocarbons through a primary reaction zone, subjecting the feed hydrocarbons therein to contact with a body of isomerization catalyst comprising aluminum halide-hydrocarbon complex liquid containing undissolved solid aluminum halide, effecting said contact in the presence of hydrogen halide under conditions such that isomerization constitutes the principal reaction and some aluminum halide is dissolved in the hydrocarbons undergoing isomerization, passing said stream in liquid phase containing isomerized hydrocarbons and aluminum halide dissolved therein from the primary zone to a secondary zone, subjecting said stream in the secondary zone to contact with aluminum halide hydrocarbon complex liquid which is relatively free from undissolved solid aluminum halide, effecting said secondary contact at a temperature in the range about 70 to 300° F. such that said lean complex extracts from said liquid stream aluminum halide dissolved therein and forms complex enriched with aluminum halide, discharging from said secondary zone said hydrocarbon stream relatively free from aluminum halide, withdrawing enriched complex liquid from said secondary zone, and passing it at least in part to said primary zone to provide a portion of the catalyst therein.

12. In a continuous process for effecting catalytic conversion of hydrocarbons by the action of a metallic halide conversion catalyst, the metallic halide being at least partially soluble in the hydrocarbons undergoing treatment, the steps comprising passing a stream of feed hydrocarbons through a reaction zone, subjecting the hydrocarbons to contact therein with a catalyst body comprising metallic halide-hydrocarbon complex liquid and having free metallic halide dispersed in said complex liquid, effecting contact in the presence of hydrogen halide at a conversion temperature without substantial volatilization of said metallic halide such that substantial conversion occurs and some metallic halide is dissolved in the hydrocarbons undergoing conversion, continuously withdrawing from further contact with the catalyst a hydrocarbon stream containing reacted hydrocarbons and having free metallic halide dissolved therein, withdrawing from the reaction zone used complex liquid, subjecting withdrawn complex liquid to contact with a stream of feed hydrocarbons passing to the reaction zone whereby free metallic halide retained in withdrawn complex is extracted therefrom by solution in said stream of feed hydrocarbon leaving a stripped complex, subjecting said withdrawn stream to contact in a separate zone while in liquid phase with stripped complex liquid, effecting the contact in the separate zone under conditions such that free metallic halide contained in the withdrawn stream is extracted therefrom by said lean complex, and discharging from said separate zone liquid hydrocarbons substantially reduced in metallic halide content.

13. The process according to claim 12 in which the metallic halide is an aluminum halide.

14. A process for converting hydrocarbons comprising passing a feed hydrocarbon stream to a conversion zone containing a fluid catalyst comprising metallic halide-hydrocarbon complex having free metallic halide dispersed therein, subjecting feed hydrocarbons and catalyst to contact therein in the presence of hydrogen halide under conditions such that substantial conversion of hydrocarbons occurs and some metallic halide is dissolved in the hydrocarbons undergoing conversion, withdrawing from the conversion zone a stream of liquid comprising converted hydrocarbons having metallic halide dissolved therein, withdrawing from the conversion zone used complex liquid relatively saturated with metallic halide, subjecting withdrawn complex liquid to separate contact with a stream of untreated hydrocarbons in liquid phase such that metallic halide is stripped from the withdrawn complex to form relatively unsaturated stripped complex, and subjecting withdrawn converted hydrocarbons retaining dissolved metallic halide to contact in liquid phase with stripped complex under conditions such that said retained metallic halide is removed at least in substantial amount by stripped complex from said converted hydrocarbons.

15. A process for converting hydrocarbons comprising passing a feed hydrocarbon stream to a conversion zone containing a fluid catalyst comprising metallic halide-hydrocarbon complex having free metallic halide dispersed therein, subjecting feed hydrocarbons and catalyst to contact therein in the presence of hydrogen halide under conditions such that substantial conversion of hydrocarbons occurs and some metallic halide is dissolved in the hydrocarbons undergoing conversion, withdrawing from the conversion zone a stream of liquid comprising converted hydrocarbons having metallic halide and hydrogen halide dissolved therein, withdrawing from the conversion zone used complex liquid relatively saturated with metallic halide and hydrogen halide, subjecting withdrawn complex liquid to separate contact with a stream of untreated hydrocarbons in liquid phase such that metallic halide and hydrogen halide are stripped from the withdrawn complex to form relatively unsaturated stripped complex, and subjecting withdrawn converted hydrocarbons retaining dissolved metallic halide and hydrogen halide to contact in liquid phase with stripped complex under conditions such that said retained metallic halide and hydrogen halide are removed at least in substantial amount by stripped complex from said converted hydrocarbons.

EUGENE E. SENSEL.